Aug. 11, 1964 W. E. ARNOLDI 3,144,317
FREEZING PROCESS FOR REMOVAL OF CARBON DIOXIDE FROM AIR
Filed June 28, 1960 3 Sheets-Sheet 1
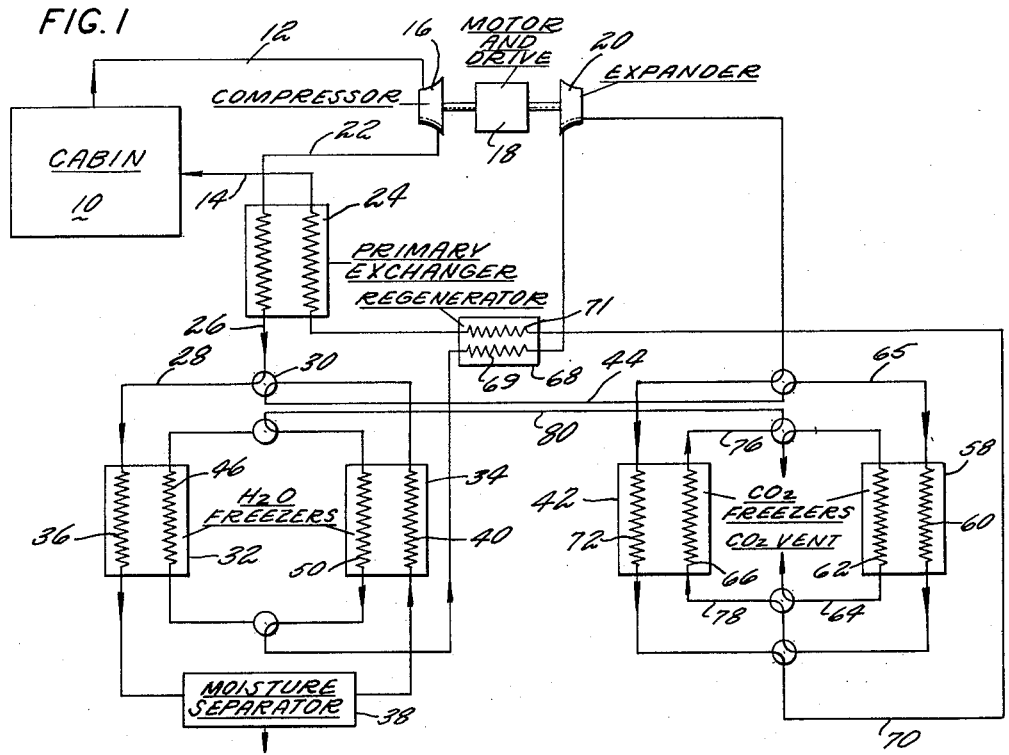
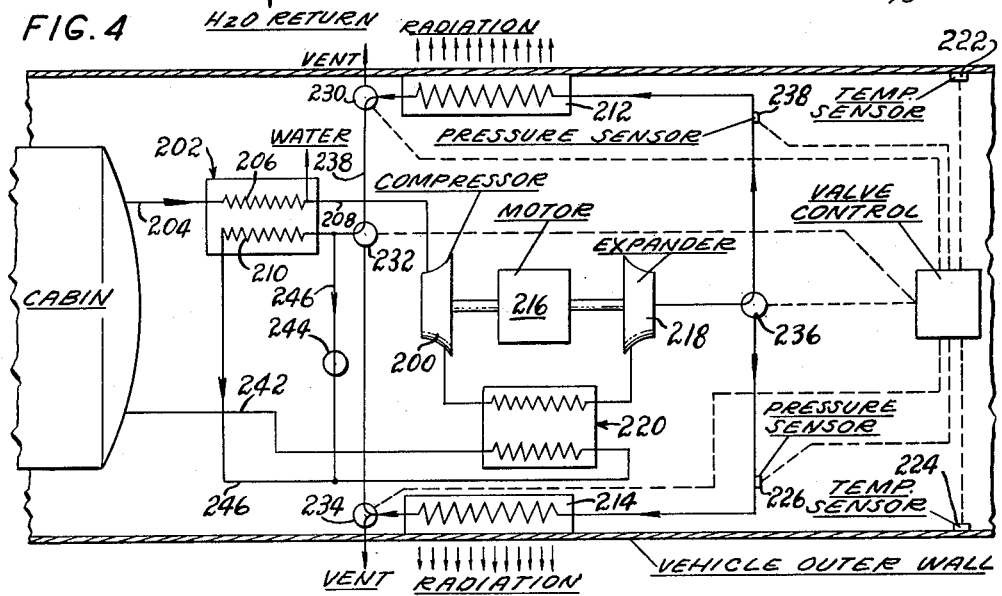
INVENTOR
WALTER E. ARNOLDI
BY Leonard F. Werblund
ATTORNEY

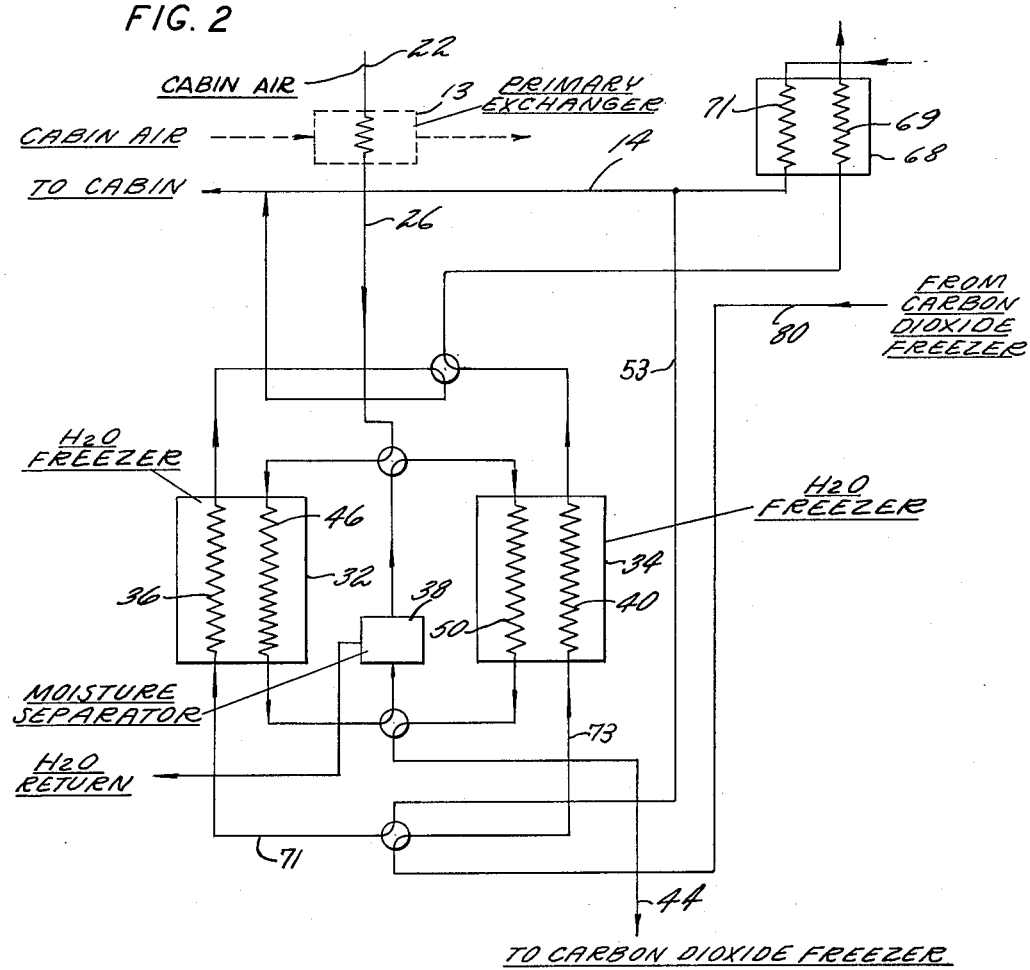

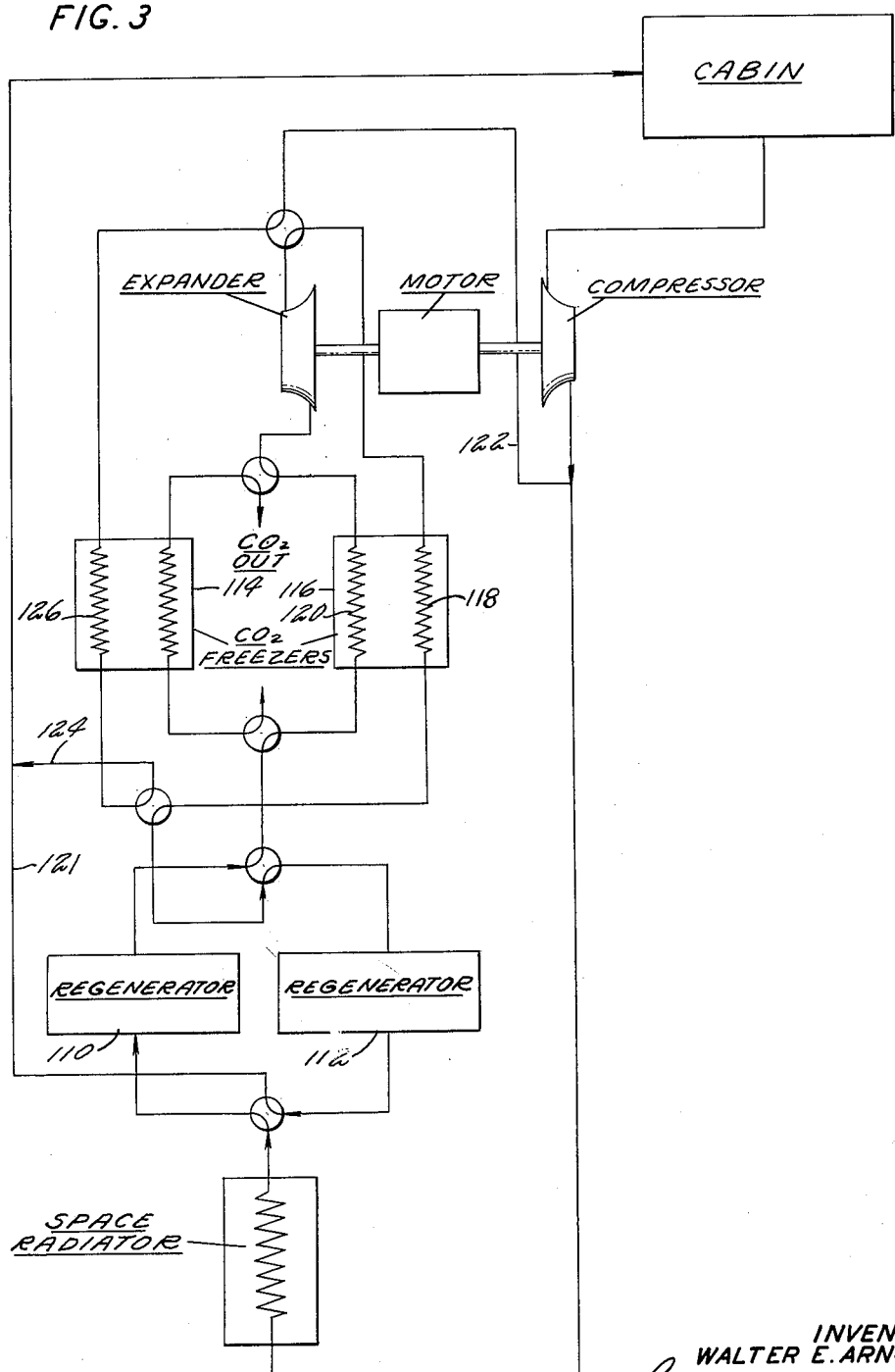

United States Patent Office 3,144,317
Patented Aug. 11, 1964

3,144,317
FREEZING PROCESS FOR REMOVAL OF CARBON DIOXIDE FROM AIR
Walter E. Arnoldi, West Hartford, Conn., assignor to United Aircraft Corporation, East Hartford, Conn., a corporation of Delaware
Filed June 28, 1960, Ser. No. 39,385
4 Claims. (Cl. 62—12)

This invention relates to an environmental control system for a closed compartment which is occupied by one or more human beings, and more particularly to a system for extracting carbon dioxide from the artificial atmosphere of such a sealed cabin in order to limit the concentration of carbon dioxide to a level compatible with support of human life. It is fundamentally important in such a sealed compartment, as, for example, in an outer space vehicle, to provide means for reconditioning the air so as to preserve a habitable atmosphere with regard to physical state and chemical composition, and an essential requirement is found in the need to remove carbon dioxide at a rate substantially equivalent to the rate at which it is generated by the human occupants.

Industrial operations, particularly those concerned with the synthesis or purification of certain gas mixtures of gases, have employed various types of systems for removal of carbon dioxide, including methods of chemical absorption, adsorption, liquefaction, and freezeout, but their concern has been primarily with removal of carbon dioxide within economic considerations pertinent to operations on or near the surface of the earth, where power required and equipment weight are not of the same degree of importance as in a space vehicle. Therefore, it is an object of this invention to provide a carbon dioxide freezout system which lends itself particularly to the requirements of a space vehicle and is characterized by high thermodynamic efficiency, low power consumption, and inherently low system weight so as to avoid undue penalties to the overall performance of a manned space vehicle.

It is still a further object of this invention to remove carbon dioxide from the contained atmosphere by a system as described at a rate substantially equivalent to the rate at which it is being introduced into the closed compartment atmosphere by the exhalations of the human occupants, that is to say that the concentration of carbon dioxide will not for any significant period of time exceed a previously established maximum allowable concentration level. This may be accomplished either by continuous or intermittent operation of the system.

It is an important feature of this invention to utilize the heat which is extracted from the processed atmosphere in reducing its temperature to the range in which carbon dioxide will be frozen, for reheating this processed atmosphere after carbon dioxide separation and prior to returning it to the closed compartment.

It is a still further object to provide a system in which the processed atmosphere is used as the refrigerant fluid for abstracting heat from the gas cooled and delivering it to the returning gas or other means for heat rejection at temperatures higher than the freezing temperature range of the carbon dioxide removed.

Upon reviewing the description which is made in conjunction with the following drawing, one skilled in the art will readily realize that various modifications may be made without departing from the spirit and scope of this invention.

FIG. 1 diagrammatically illustrates a preferred embodiment of this invention including a system for removing both water and carbon dioxide.

FIG. 2 is a partial showing of a schematic illustration of another embodiment of this invention.

FIG. 3 diagrammatically illustrates another preferred embodiment which utilizes a pair of regenerators selectively connected with a pair of carbon dioxide freezers.

FIG. 4 diagrammatically illustrates this invention and utilizes a plurality of space radiators which form or are incorporated in a portion of the wall of a spaced vehicle.

Referring more particularly to FIG. 1, a cabin generally indicated by numeral 10 is shown to have inlet conduit 14 and exit conduit 12 connecting a water and carbon dioxide freezeout system. The word cabin in this instance has been selected for the convenience of terminology and is to be understood that compartments, cabins, or the combination thereof is equally applicable. Air which has been contaminated by the exhalation of the occupants of the cabin is extracted by compressor 16 which is driven by the combination of motor 18 and expander 20 which may take the form of any of the well known positive or non positive displacement expansion motors. As will be appreciated from the following description, the compressor and expander are connected in bootstrap relationship, that is to say that the air which is being compressed is subsequently used to propel the expander in such a manner that energy is expended from the compressed air so as to be substantially adiabatically expanded, which results in a substantial temperature drop. Of course, a portion of the power for compression is supplied by the expander while the remainder portion may be supplied by an electrical motor or any other suitable means. As the air leaves the compressor, it is precooled by primary heat exchanger 24 and directed therefrom to the water freezer by 4-way valve 30 which connects line 26 to line 28. It will be realized that while one set of freezers is utilized for removing water and carbon dioxide from the air stream, the second set is being regenerated and held in a stand-by condition until a predetermined time so as to allow either one of the freezer systems to complete its cycle. The method for automatically cyclically connecting the water freezers to the carbon dioxide freezers is well known in the art, while it should be realized that connecting the carbon dioxide discharged air to the water freezers is an important feature to this invention as will be more fully appreciated from the description to follow.

Still referring to FIG. 1, the precooled compressed air is passed through passage 36 of heat exchanger 32 for condensing its moisture and for melting the ice which has accumulated from the previous cycle and leaves therefrom at a temperature, say 35° F. The moisture is in turn fed to moisture separator 38 where the moisture is collected in any of the well-known types and in such a manner so as not to interfere with the air stream which is directed to passage 40 of heat exchanger 34 for further cooling of the air. The purpose of this operation is to assure that the air fed to the carbon dioxide freezout system is substantially free of all of its moisture content. Owing to the fact that the air in passage 50 which has previously been in communication with the carbon dioxide freezers is at a low temperature; the temperature of the air in passage 40 which is in heat transfer relation thereto will be reduced to, say −150° F. The air, now essentially free of its moisture, is then fed to passage 60 of heat exchanger 58 which is in out-of-contact heat relation with the fluid in passage 62 which has accreted frozen carbon dioxide from the previous cycle. The temperature of the air in passage 60 is decreasing, due to the transfer of heat to passage 62 which sustains the rate of sublimation of the carbon dioxide. The sublimed carbon dioxide is then vented out of the system to a low pressure or zero pressure environment via line 64 and 63. The now colder air is admitted to freezer 42 where a major fraction of the carbon dioxide in the processed air freezes and accretes within passage 66. The air which is now at a low temperature, say −240° F., is fed to passage 50 of freezer 34, taking up some of the heat released by freezing the water in passage 40 as previously mentioned and then fed through regenerator heat exchanger 68 for recooling the air and then to expansion motor 20 for further cooling of the air. The air is then delivered to freezer 42 where it is utilized for bringing down the temperature of the air contaminated with carbon dioxide in passage 66 for the purpose of condensing and separating carbon dioxide as previously mentioned. The air is then delivered to the cabin via passage 70 passing through regenerator 68 and primary heat exchanger 24 and picking up heat through each one of these devices.

From the foregoing, it is apparent that a large portion of the energy which as been expended in lowering the temperature of the carbon dioxide and water contaminated air is regained by precooling the air stream at various locations in the cycle, prior to readmittance to the cabin. Although not shown, the water collected in the moisture separator 38 may be ejected into the cabin for rehumidification purposes or collected and used in liquid form. It is an important feature of this invention that the sublimated carbon dioxide is venting without incurring an appreciable loss of water, which, in a space vehicle, is a valuable commodity.

Upon reaching a predetermined load in the freezers, the activated freezers may be automatically or cyclically connected in the following manner. Although it is to be understood that the water freezeout system and carbon dioxide freezeout system may be cycled independently of each other, the air discharging from primary heat exchanger 24 is directed to passage 40 of freezer 34 and melting frozen water which had accumulated therein and passing the moisture laden water through the moisture separator 38 and then to passage 36 of heat exchanger 32 and delivering the air at a lower temperature through passage 72 of freezer 42. At this point the air rejects heat to the carbon dioxide laden passage 66 which now provides means for sustaining the rate of sublimation therein so as to facilitate the process of venting the carbon dioxide via passages 76 and 78 to a low or zero pressure environment. The now cooler air discharging from freezer 42 is delivered to passage 62 of freezer 58 where heat is absorbed therefrom causing condensation of the carbon dioxide within the chamber of the freezer. The carbon dioxide free air is then delivered via passage 80 to passage 46 of heat exchanger 32 which supplies the low temperature sink for bringing the dew point temperature of the moisture laden air in passage 36 to say, −150° F. At this point the air discharging from passage 46 is slightly warmer and is again precooled at regenerator 68 and delivered to expander 20 for further lowering of its temperature prior to delivery to passage 60 of heat exchanger 58. From this point the air is then redelivered to the cabin via line 70, regenerator 68, heat exchanger 24, and line 14 absorbing heat in each one of these heat transfer devices. Reversing exchangers and their operation are well known in the art and may be operated either manually or automatically.

Another exemplified system is shown in FIG. 2 which is substantially similar to FIG. 1 which has been modified in its preferred form in such a manner as to more effectively utilize the heat transfer effectiveness of the water freezers. As will be noted as shown in FIG. 1 on alternate cycles, passages 46 and 50 of heat exchangers 34 and 36 respectively have been dead-ended. In order to utilize the heat transfer effectiveness of these heat exchangers, the flow path of the embodiment shown in FIG. 2 has been arranged so that the fluid is continuously flowing through these passages in such a manner as to be in heat transfer arrangement so as to precool the air prior to freezing the moisture content. As will be noted, another valve and associated connecting conduits have been included to divide the flow in line 14 for bleeding cool air via lines 53 and 71 and alternately via lines 53 and 73 so as to take advantage of the low heat content within the water freezers. It will also be noted that the manner of feeding the air stream to the water freezers has been modified by alternately connecting the heat exchanger discharge air in line 26 to passages 46 and 50 in freezers 32 and 34 respectively. It will further be noted that these passages are alternately connected to the moisture separator. This arrangement makes possible the use of a much smaller and consequently lighter weight heat exchanger generally indicated by numeral 13. This heat exchanger may be entirely eliminated but is shown in this particular embodiment because with its inclusion the component units such as the freezers and expanders may be utilized at lower efficiencies and also making the system operable over a wide range of temperature conditions.

In accordance with this invention, an example of the condition of the air as evidenced in each component is included hereinbelow for illustration purposes. The following will be evidenced when the compressor efficiency is 90%, the expander efficiency is 85%, regenerative heat exchanger effectiveness is 90%, and the freezer effectiveness is 90%. Referring to the embodiment shown in FIG. 2 in conjunction with the embodiment of FIG. 1 and assuming the following conditions to exist in the cabin.

$T = 35.0$
$P = 5.0$
$W_1 = 1.282$
$W_2 = 2.16$ where

T is the temperature in degrees Fahrenheit,
P is the absolute pressure in pounds per square inch.
$W_1$ is the weight percentage of carbon dioxide in contaminated air.
$W_2$ is weight percentage of water in the contaminated air.

The condition of system components are:

At the compressor discharge:
$T = 222.0$
$P = 14.0$

At primary heat exchanger discharge:
$T = 218.50$
$P = 13.99$

At the water freezer in discharge passage 46:
$T = 35.0$
$P = 13.79$
$W_2 = 1.705$ At the inlet of water freezer passage 50:
$T = 35.0$
$P = 13.78$
$W_2 = 0.455$ At the discharge of the same:
$T = -160.0$
$P = 13.58$
$W_2 = $ essentially 0

At the discharge of passage 60 of freezer 58:
$T = -179.0$
$P = 13.68$

At the discharge of passage 66 of freezer 42:
$T = -206.0$
$P = 13.48$
$W_1 = 0.47$ At the discharge of passage 40 of freezer 34:
$T = 11.0$
$P = 13.38$ At the discharge of passage 69 of regenerator 68:
$T = -165.0$
$P = 13.37$ At discharge of expansion motor 20:
$T = -230.7$
$P = 5.31$ At the discharge of passage 72 of freezer 42:
$T = -183.9$
$P = 5.11$ At the discharge of passage 71 of regenerator 68:
$T = 8.0$
$P = 5.1$ At the discharge of passage 36 of freezer 32:
$T = 209.5$
$P = 5.07$ From the foregoing example, it will be apparent that the temperature differential across the heat transfer portion of all the freezers, heat exchangers, and regenerators, which are all in their preferred form of the counterflow type, is at a substantially low value so that the efficiency of the respective heat transfer devices will evidence a minimum of entropy rises. As a result, a substantial reduction of the power requirements is realized.

Referring to FIG. 3 which shows another exemplary embodiment of this invention which particularly includes a pair of regenerators 110 and 112 which are alternately connected to freezers 114 and 116 and cyclically freezing carbon dioxide and venting the sublimed carbon dioxide. To facilitate in the explanation of this embodiment, explanation of the major parts which have already been described in the above, have been omitted. It will be noted that a space radiator, which may be mounted so that one of its surfaces forms a part of the outer skin of a space vehicle or projecting outwardly from the vehicle, is utilized for extracting a portion of the heat in order to reduce the temperature of the air prior to delivery to the regenerator. The regenerator serves to extract heat from the air passing therethrough and retaining this heat in a manner well known in the art and then delivering the lower temperature air to carbon dioxide freezer. In one cycle, for example, carbon dioxide in the air in the carbon dioxide freezer 116 is condensed and the solid carbon dioxide accretes on the wall of the freezer whereupon carbon dioxide free air is then delivered to the expander, where its temperature is reduced and passed through passage 118 which is in out-of-contact heat relation to passage 120 for absorbing the energy for condensing the carbon dioxide. The air is then alternately passed to the regenerator which has previously been heated and then returned to the cabin via passage 120. Simultaneously, the inactive freezer 114 is connected to the compressor discharge air via passage 122 where it mixes with the carbon dioxide free air in line 121 by way of line 124 which was in communication with passage 126 of freezer 114. At this point the warmer air serves to increase the rate of sublimation of carbon dioxide which has accreted in freezer 114. When the temperature and pressure of the freezer have reached predetermined values, the operation is switched so that collected frozen carbon dioxide is now sublimated and vented out to a low of zero pressure environment, and the freezer which has previously been vented is now connected so as to collect frozen carbon dioxide.

FIG. 4 is another system for removing carbon dioxide by a freezing process wherein the sublimed carbon dioxide is vented out of the system at a rate substantially equal to the rate at which it is being introduced to the cabin. The radiators, which may be mounted to the outer skin of the outer space vehicle, are ideally suited for this particular application as is illustrated by the principle stated in the Stefan-Boltzmann Law wherein heat is radiated at the rate in accordance with the following expression:

$$Q = \epsilon A \sigma T^4$$

where
$\epsilon$ is an emissivity coefficient
A is surface effective area
T is absolute temperature
$\sigma$ is a fundamental numerical constant Hence, if a gas is passed through a radiator which can reject heat to space and is insulated from other sources of heat, the gas will be cooled. When the liquefaction (or sublimation) temperature of a chemical constituent of the gas is reached, that constituent will change its state and no longer be associated with the previous gas mixture. This type of gas purification process is particularly appropriate to a space vehicle, since, except in the direction of the sun or a planet, the heat receiver is essentially all space to infinity, with a receiver equivalent temperature of zero absolute.

Thus, carbon dioxide and water may be condensed from vapor to solid states, whence they will be separated from the cabin atmosphere by passage through the radiator.

Reference is hereby made to U.S. application Ser. No. 39,366, filed on June 28, 1960, now U.S. Patent 3,093,470, and assigned to the same assignee, which application is directed toward the carbon dioxide removal system shown in FIGS. 1 and 3 of this application.

The precooler(s) and the compressor-heat exchanger-expander unit permit a reduction in the amount of heat which will need to be abstracted by radiation, hence realizing a reduction in the size of the radiator, as well as providing the possibility of separately recovering and disposing of the water and the carbon dioxide. The radiators may be connected in parallel relation to each other so as to be adapted for automatically actuating the one exposed to the lowest temperature.

Still referring to FIG. 4, the cabin air extracted from the cabin is directed to the suction side of the compressor 200. A water freezer 202 is disposed between the cabin and the compressor so that the issuing air passing through line 204 is conducted through passage 206 of the freezer and thence to line 208 to the compressor. Passage 206 is in indirect heat transfer exchange with passage 210 which contains the residual air discharging alternately from the radiators 212 and 214. Since the air issuing from the cabin is relatively warmer than the air issuing from the radiators, the temperature of the air being delivered to the compressor is substantially reduced while the temperature of the air being returned to the cabin will be substantially increased. As was noted in connection with the compressor-expander combination described above, likewise a motor 216 supplies a portion of the energy, while an expander 218 supplies the remainder amount of energy for driving the compressor.

A heat exchanger 220 is disposed between the compressor and expander for recooling the compressor discharge air which was heated to some extent by virtue of the compressing operation. A substantial temperature drop is evidenced across the expander and the size of the expander is selected so as to reduce the temperature of the contaminated air to a value just above the carbon dioxide freezing point. This is to assure that freezing of the carbon dioxide will occur only in either radiators 212 or 214 where the radiation effect will reduce the temperature sufficiently to condense the carbon dioxide. In space application, the radiator which is spaced away from the rays of the sun will be utilized during this operation. Thus, temperature sensors 222 and 224 measuring the temperature of the skin of the vehicle serve to selectively direct the flow of the air stream to the proper radiator. As the passages in the radiator accrete with the condensed carbon dioxide, the flow of the air stream will become impeded and could become blocked off. To prevent this from occurring, a pair of pressure sensors 226 and 228 are employed to measure the pressure upstream of radiators 214 and 212 respectively. When the pressure in either line builds up to a predetermined value, the radiators will be alternated so that the radiator which was condensing will be vented and the radiator which was venting will now be condensing. This is accomplished by rotating valves 230, 232, 234 and 236.

Returning to the flow path of the system, the air discharging from the radiator 12, which now is substantially free of moisture and carbon dioxide is directed to water freezer 202 by way of valve 230, line 238, valve 232 and line 240. The now purified air as was mentioned above is passed through passage 210 to regain heat and then directed back through heat exchanger 220 and returned to the cabin via line 242. To assure that the air being returned to the cabin is at the proper temperature level, valve 244 and its cooperating connection 246 directs a portion of the cold purified air upstream of passage 210 directly into line 246 where it mixes from the air discharging from the passage 210 prior to being returned to the cabin. While the radiator 212, as is shown in the drawing, is condensing, carbon dioxide radiator 214 is being vented to the low pressure and temperature atmosphere which in this instance is outer space which is substantially at zero absolute pressure. It will be noted that during the venting operation the radiator and its associated ducting are disconnected from the remaining portion of the system so that the amount of air vented is held to a minimum. Owing to this low pressure source, the carbon dioxide sublimates so that the carbon dioxide is vented with expending a small amount of power. As noted in connection with the carbon dioxide freezers of the other systems described in the above, the space radiators 212 and 214 are alternately condensing and venting carbon dioxide by selectively rotating valves 230, 232, 234 and 236.

What has been shown in this invention are systems which are capable of removing water and carbon dioxide at a rate substantially equal to the rate at which it is being injected into the system by the exhalations of the human occupants occupying the cabin. Since the heat which as been extracted for condensing the carbon dioxide is again utilized for reheating the air in its return to the cabin, a lightweight system is evidenced and the power consumed by the operation whether to be for continuous or intermittent operation is held at a minimum, thereby assuring a minimum penalty from both a weight and power standpoint.

It will further be realized that most of the moisture entrained in the air is removed prior to delivery to the carbon dioxide freezers and in such a manner that the water will not be vented along with the carbon dioxide. Also, this permits the use of a smaller and consequently lighter weight heat transfer device. It should be understood that the invention is not limited to the particular embodiments shown and described herein, but that various changes and modifications may be made without departing from the spirit or scope of this novel concept as defined by the following claims.

I claim:

1. The process for purifying air captured in a sealed compartment subjected to the exhalations of its occupants by removing the carbon dioxide therefrom wherein the compartment is in a space vehicle having freedom of mobility with respect to the sun's orientation comprising the steps of:
   (1) extracting the air from said compartment,
   (2) precooling the air by indirect heat exchange to a temperature above the freezing point of the water content of the air so as to condense substantially all of said water content,
   (3) pressurizing the water-free air,
   (4) further cooling said pressurized air to a temperature just above the freezing point of carbon dioxide, where the further cooling comprises the steps of indirect heat exchange of said water-free air and by work expansion of said water-free air,
   (5) still further cooling of said further cooled air to a temperature at which the carbon dioxide in the air freezes to a solid in one of a pair of freezing devices,
   (6) each of said freezing devices being located in said space vehicle so that only one of said devices will be orientated in the path of the sun's rays while the other is shielded from the sun's rays,
   (7) venting one of said freezing devices to atmosphere which atmosphere is at a pressure below the triple point of said carbon dioxide when said one of said freezing devices is orientated in the path of the sun's rays so that the heat propagated thereby will cause said solid carbon dioxide to sublimate and vent to said atmosphere, and
   (8) returning said carbon dioxide in said other freezing device which is radiating heat to said atmosphere for freezing said carbon dioxide back to said compartment whereby said carbon dioxide free air is placed in indirect heat exchange mentioned in the steps of precooling and further cooling.

2. An environmental control system for removing carbon dioxide air in a sealed compartment having enclosing walls and being subjected to the exhalations of its occupants, passageways connected to said compartment, a first heat exchanger in said passageways for reducing the temperature of the air to a value above the carbon dioxide freezing temperature, first and second space radiators in said passageways for condensing carbon dioxide from said air, a compressor, a motor and expander for driving said compressor, said expander reducing the temperature of said air so that the temperature of the air entering said radiator is just above the carbon dioxide freezing point, a second heat exchanger in said passageways disposed between said compressor and said expander, means defining a flow path for successively passing air in said passageways from said compartment to said first heat exchanger to said compressor to the second heat exchanger to the expander to one of said radiators back to said first heat exchanger back to said second heat exchanger and back to said compartment, means including a conduit for defining a second flow path, a low pressure source communicating with said conduit, and means for interconnecting said conduit and said second radiator and simultaneously disconnecting said second radiator and said passageways.

3. A system as defined in claim 2 including means responsive to the temperature of opposing walls of the compartment, means for alternating the flow path in response to said temperature responsive means so that the flow successively passes from said compartment to said first heat exchanger to said compressor to said second heat exchanger to said expander to said second radiator back to said first heat exchanger back to said second heat exchanger and back to said compartment.

4. A system as defined in claim 2 including means responsive to the pressure upstream of each of said radiators and means responsive to said pressure responsive means for alternating the flow path in accordance with said pressure so that the flow successively passes from said compartment to said first heat exchanger to said compressor to said second heat exchanger to said expander to said second radiator back to said first heat exchanger back to said second heat exchanger and back to said compartment.

References Cited in the file of this patent
UNITED STATES PATENTS
1,976,933    Gobert _____ Oct. 16, 1934
(Other references on following page)

UNITED STATES PATENTS

| | | | |
|---|---|---|---|
| 2,022,782 | Pollitzer | Dec. | 3, 1935 |
| 2,084,474 | Booth | June | 22, 1937 |
| 2,084,987 | Borchardt | June | 29, 1937 |
| 2,089,558 | Karwat | Aug. | 10, 1937 |
| 2,323,511 | Baker | July | 6, 1943 |
| 2,327,133 | Schuftan | Aug. | 17, 1943 |
| 2,504,051 | Scheibel | Apr. | 11, 1950 |
| 2,545,194 | Colburn | Mar. | 13, 1951 |
| 2,571,014 | Colburn | Oct. | 9, 1951 |
| 2,626,510 | Schilling | Jan. | 27, 1953 |
| 2,641,114 | Holthaus | June | 9, 1953 |
| 2,724,954 | Maetz | Nov. | 29, 1955 |
| 2,730,875 | Ranke | Jan. | 17, 1956 |
| 2,777,301 | Kuhn | Jan. | 15, 1957 |
| 2,827,775 | Linde | Mar. | 25, 1958 |
| 2,930,202 | Yendall | Mar. | 29, 1960 |
| 2,932,174 | Schilling | Apr. | 12, 1960 |
| 2,940,269 | Frainier | June | 14, 1960 |
| 3,093,470 | Melikian | June | 11, 1963 |

FOREIGN PATENTS

| | | | |
|---|---|---|---|
| 908,021 | France | Apr. | 6, 1945 |